(12) United States Patent
Yezersky et al.

(10) Patent No.: US 6,514,001 B1
(45) Date of Patent: Feb. 4, 2003

(54) VARIABLE LENGTH SHAFT AND METHOD FOR MAKING THE SAME

(75) Inventors: Grigory Yezersky, Farmington Hills, MI (US); Gerald Cilibraise, Livonia, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/474,116

(22) Filed: Dec. 29, 1999

(51) Int. Cl.[7] .............................. B62D 1/18; F16B 7/10; F16B 7/14
(52) U.S. Cl. ...................... 403/109.1; 280/775; 74/493; 403/109.7; 403/359.1; 188/267.1
(58) Field of Search ........................... 188/267.1, 267.2; 474/110, 135, 133, 109, 101; 74/493, 492; 280/775, 777; 403/109.1, 109.7, 359.1

(56) References Cited

U.S. PATENT DOCUMENTS

| | | | |
|---|---|---|---|
| 3,656,366 A | * 4/1972 | Somero | 74/492 |
| 3,831,998 A | * 8/1974 | Hewitt | 296/35.2 |
| 4,643,448 A | * 2/1987 | Loren | 280/777 |
| 4,886,295 A | * 12/1989 | Browne | 280/777 |
| 5,018,606 A | * 5/1991 | Carlson | 188/267.1 |
| 5,267,633 A | 12/1993 | Endo et al. | 188/267.1 |
| 5,293,968 A | * 3/1994 | Schuelke et al. | 188/282.3 |
| 5,316,112 A | * 5/1994 | Kimura et al. | 188/267.1 |
| 5,492,312 A | * 2/1996 | Carlson | 267/140.14 |
| 5,588,509 A | * 12/1996 | Weitzenhof et al. | 188/267.1 |
| 5,694,320 A | 12/1997 | Breed | 701/45 |
| 5,870,930 A | * 2/1999 | Willett et al. | 74/492 |
| 5,956,951 A | * 9/1999 | O'Callaghan | 60/326 |
| 6,070,681 A | * 6/2000 | Catanzarite et al. | 180/89.15 |
| 6,095,486 A | * 8/2000 | Ivers | 251/129.01 |
| 6,149,166 A | * 11/2000 | Struss et al. | 188/5.511 |
| 6,279,952 B1 | * 8/2001 | Van Wynsberghe et al. | 280/777 |
| 6,296,280 B1 | * 10/2001 | Struble et al. | 280/777 |
| 6,354,626 B1 | * 3/2002 | Cartwright | 74/493 |

* cited by examiner

Primary Examiner—Lynne H. Browne
Assistant Examiner—Ernesto Garcia
(74) Attorney, Agent, or Firm—Ralph E. Smith

(57) ABSTRACT

A variable length shaft is provided including a housing defining an internal space. A shaft is connected to a plunger device disposed in said internal space. The internal space is filled with magneto-rheological fluid which is selectively provided with a magnetic field for solidifying the fluid to prevent movement of the plunger within the internal space. When the magnetic field is removed, the plunger device moves freely for allowing variation in the length of the variable length shaft system.

8 Claims, 6 Drawing Sheets

VARIABLE LENGTH SHAFT AND METHOD FOR MAKING THE SAME

FIELD OF THE INVENTION

The present invention relates generally to mechanisms which allow for length adjustment of shafts or rods, and more particularly to mechanisms using a rheological fluid to perform the releasing and locking functions. Such mechanisms can be used in various applications, including headrests, steering columns and seats.

BACKGROUND AND SUMMARY OF THE INVENTION

Various types of length adjustable and torque transmittable devices are generally known in the art to be utilized in a range of applications. These devices, while allowing for length adjustment and continued torque transmittal, tend to be complex in their designs. This complexity is a result of the various mechanical features required to perform the locking and releasing functions.

In order to reduce the complexity of such mechanisms, it is an object of the present invention to provide an improved method for adjusting the length of shafts or rods, specifically those required to transmit torque. To achieve this, the present invention utilizes rheological fluid in combination with a piston-like device. The fluid can be switched between two phases, liquid and solid, by introduction of an electric or magnetic field. The solid phase effectively locks the device in position while the liquid phase allows for easy adjustment. By utilizing this invention, the mechanical latching devices, springs and racks of prior art inventions are easily replaced, reducing overall complexity. This allows for fewer parts, ease in production and ease in maintenance.

Such a device can be used in various applications. One such application is the position adjustment of a steering wheel. The variable length shaft system can be integrated into the steering column allowing for positional adjustment.

Two other applications include methods for adjusting the headrest and seatback of seats. In the headrest application, the variable length shaft system can be introduced to perform two main functions: connect the headrest to the seatback and allow for vertical adjustment of the headrest. The seatback application would use the variable length shaft system simply as a locking device, which allows a person to adjust the seatback then lock it in position.

Another application of the variable length shaft system would be for use with a door or a rear hatch of a vehicle. Integrating this system with a door could allow the door to be opened to an infinite number of positions and then can be locked in that position. Another application of the present invention is for use in an anti-whiplash headrest. This application would integrate the variable length shaft system into a headrest which additionally houses a spring loaded pivotal headrest mount. In the event of an accident the variable length shaft system would be deactivated, allowing the headrest to automatically spring forward, reducing the possibility of neck injury.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The present invention is directed primarily to mechanisms which allow for the length adjustment of shafts. It is also directed at shafts which require not only length adjustment but additionally, the ability to transfer torque before, during and after adjustment. It should be noted that the present invention can be practiced with any type of shaft system where length adjustment and/or torque transmittal are required.

Figure 1:
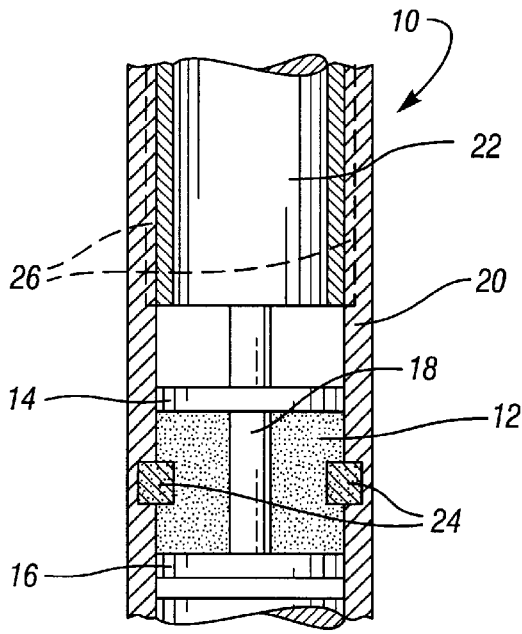
FIG. 1 is a sectional view of a variable length shaft system which utilizes an electromagnet according principles of the present invention.
Figure 9:
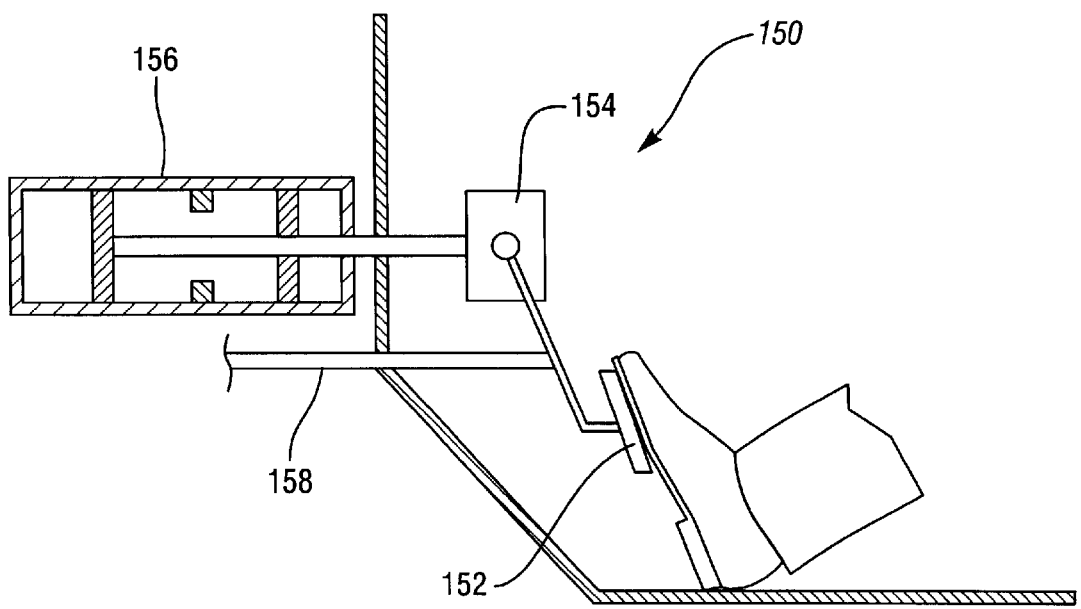
FIGS. 9 and 10 show a schematic view of an adjustable length pedal system utilizing a variable length shaft system according to the principles of the present invention.

With reference to FIG. 1, the variable length shaft system 10 will now be described in detail. The variable length shaft system 10 is essentially a closed system that permits a magneto-rheological fluid (MRF) 12 to be solidified and liquefied as desired. A plunger system is provided for engaging with the MRF 12 in both solidified and liquefied forms. According to the first embodiment, a pool of MRF 12 is located between two plungers 14, 16 which are spaced a distance apart and connected together by a rod 18. (A single plunger system can also be utilized as shown in FIG. 9.) The plungers 14, 16 and MRF 12 are located within a housing 20. Additionally, the plungers 14, 16 are connected to a shaft 22 which is slidable within the housing 20. An electromagnet 24 is located within the housing 20, between plungers 14,16 and in close proximity to the MRF 12. A section, including at least one inner spline 26 runs along a length of the housing 20 and meshes with another shaft section 22, also including at least one outer spline 27 in engagement with the at least one inner spline 26. The spline sections 26, 27 of the housing 20 and shaft 22 do not allow the shaft 22 to rotate axially within the housing 20 while still allowing the shaft 22 to move slidably along the axis within the housing 20 and transfer torque through the system.

When an electric current is introduced, the electromagnet 24 generates a magnetic field around the MRF 12. As the electromagnet 24 is located in close proximity to the MRF 12, the magnetic field generated causes the MRF 12, to solidify in milliseconds. It must now be noted that the electromagnet 24 serves as a stopping mechanism which is integrated into the housing 20 and locks the MRF 12, now solidified, into place. Other stopping mechanisms may be utilized including the use of additional parts such as a stopping ring located within the housing 20 and in contact with the MRF 12. Once the current is turned off, the electromagnet 24, ceases to create the magnetic field and the MRF 12 quickly retains its fluid form. This allows for free slidable movement of the shaft 22 within the housing 20.

Figure 2:
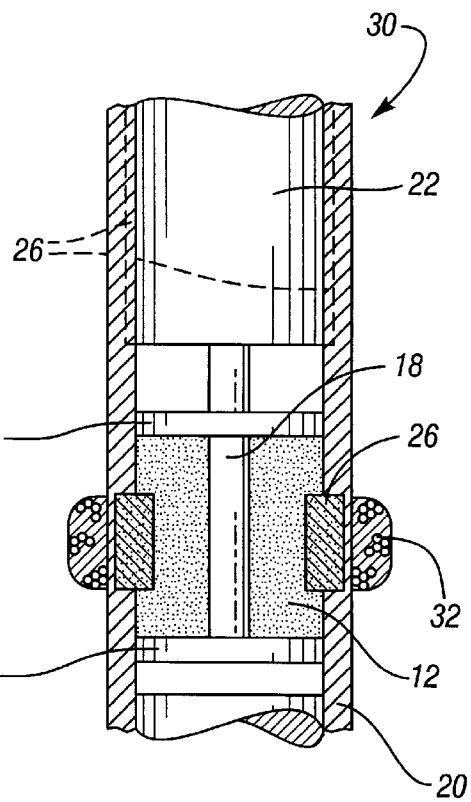
FIG. 2 is a sectional view of a variable length shaft system which utilizes both an electromagnet and a permanent magnet according to the principles of the present invention.

With reference to FIG. 2, a variable length shaft system 30 according to a second embodiment of the present invention will now be described in detail. The variable length shaft system 30 is essentially a closed system that permits a magneto-rheological fluid (MRF) 12 to be solidified and liquefied as desired. A pool of MRF 12 is located between two plungers 14, 16 which are spaced a distance apart and connected together by a rod 18. The plungers 14, 16 and MRF 12 are located within a housing 20. Additionally, the plungers 14, 16 are connected to a shaft 22 which is slidable within the housing 20. A permanent-magnet 26 is located within the housing 20, between plungers 14, 16 and in close proximity to the MRF 12. Disposed around the permanent-magnet 26 is an electromagnet 32. The permanent-magnet 26 generates a constant magnetic field. Since it is located in close proximity to the MRF 12, the magnetic field constantly acts on the MRF 12 such that it is continuously in its solid state. As described above, a stopping mechanism is provided in the system, which holds the solidified MRF 12 from movement. As with FIG. 1, the embodiment of FIG. 2 shows the magnet 26 acting as the stopping mechanism.

When an electric current is applied to the electromagnet 32, the magnetic field generated by it effectively negates the effect of the magnetic field generated by the permanent-magnet 26. This allows the MRF 12 to return to its liquid state which in turn allows the shaft 22 to be slidably moved within the housing 20.

A section, including at least one inner spline 26 can be introduced to run along a length of the housing 20 and mesh with another shaft section 22, also including at least one outer spline 27 in engagement with the at least one inner spline 26. The spline sections 26, 27 of the housing 20 and shaft 22 do not allow the shaft 22 to rotate axially within the housing 20 while still allowing the shaft 22 to move slidably along the axis within the housing 20. This allows for torque transfer through the shaft system.

Figure 3:
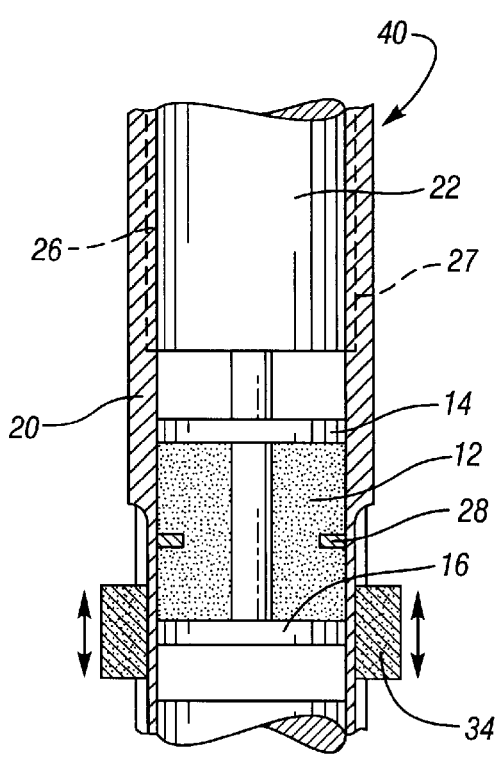
FIG. 3 is a sectional view of a variable length shaft system which utilizes a slidable permanent magnet according to the principles of the present invention.

With reference to FIG. 3, the variable length shaft system 40 according to a third embodiment of the present invention will now be described in detail. The variable length shaft system 40 is essentially a closed system that permits a magneto-rheological fluid (MRF) 12 to be solidified and liquefied as desired. A pool of MRF 12 is located between two plungers 14, 16 which are spaced a distance apart and connected together by a rod 18. The plungers 14, 16 and MRF 12 are located within a housing 20. Additionally, the plungers 14, 16 are connected to a shaft 22 which is slidable within the housing 20. A permanent-magnet 34 is located outside of the housing 20, but in close proximity to the MRF 12. This permanent-magnet 34 is slidable along the outside of the housing 20 over a distance. This distance must be great enough to allow the permanent-magnet 34 to be slid into an area between the plungers 14, 16. The permanent-magnet 34 generates a constant magnetic field. When it is located in close proximity to the MRF 12 (i.e. between the plungers 14, 16), the magnetic field constantly acts on the MRF 12 such that it is continuously in its solid state. As described above, a stopping mechanism 28 is provided in the system, which holds the solidified MRF 12 from movement. The embodiment of FIG. 3 shows a ring or clip within the MRF 12 chamber, acting as the stopping mechanism 28. This is only one embodiment of various methods which may be used to hold the MRF 12 in place while in the solid state.

A section, including at least one inner spline 26 can be introduced to run along a length of the housing 20 and mesh with another shaft section 22, also including at least one outer spline 27 in engagement with the at least one inner spline 26. The spline sections 26, 27 of the housing 20 and shaft 22 do not allow the shaft 22 to rotate axially within the housing 20 while still allowing the shaft 22 to move slidably along the axis within the housing 20. This allows for torque transfer through the shaft system.

Figure 11:
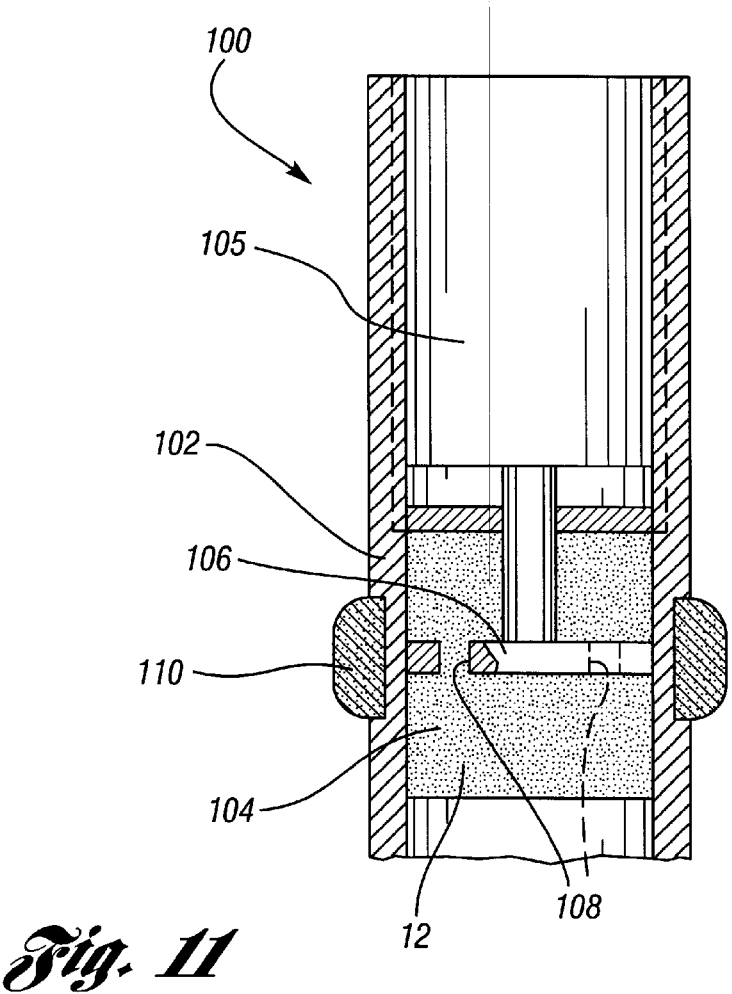
FIG. 11 is a sectional view of a variable length shaft system having a single plunger according to the principles of the present invention.

With reference to FIG. 11, a variable length shaft system 100 is shown including a housing 102 defining an internal chamber 104. A single plunger 106 attached to a movable shaft 105 is disposed in the chamber 104 along with MRF fluid 12. The plunger 106 is provided with passages 108 which allow the MRF 12 to flow through in the liquid state. The passages 108 also provide a dampening effect to prevent too rapid of a movement of the plunger 106 relative to the housing 102. When a magnetic field is applied to the MRF 12 by a magnet 110, the MRF 12 solidifies and prevents movement of the plunger 106. Any of the magnet systems as described above with reference to FIGS. 1–3 can be adapted for switching between solid and liquid states.

Figure 12:
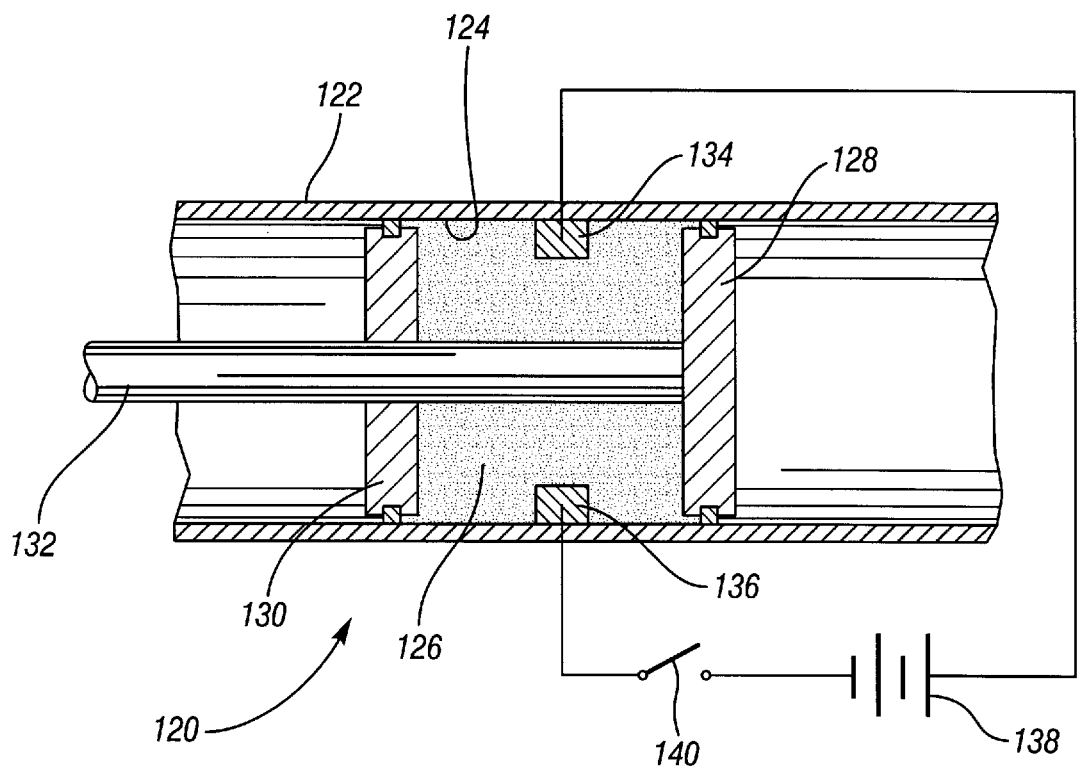
FIG. 12 a sectional view of an electrically activated variable length shaft system according to the principles of the present invention.

With reference to FIG. 12, an electrically activated variable length shaft system 120 is shown including a housing 122 defining an internal chamber 124. A pool of electro-rheological fluid (ERF) 126 is located between two plungers 128, 130 which are spaced a distance apart and connected together by a rod 132. The rod 132 is capable of being moved relative to the housing 122 when the ERF 126 is in a liquid form. Electrodes 134, 136 are provided to be selectively charged by a battery or other electric source 138 via activation of a switch 140. When the electrodes 134, 136 provide an electric field to the ERF 126, the ERF 126 solidifies and maintains the rod 132 in a fixed position relative to the housing 122. When the electric field is removed, the rod 132 moves freely relative to the housing 122.

Figure 4:
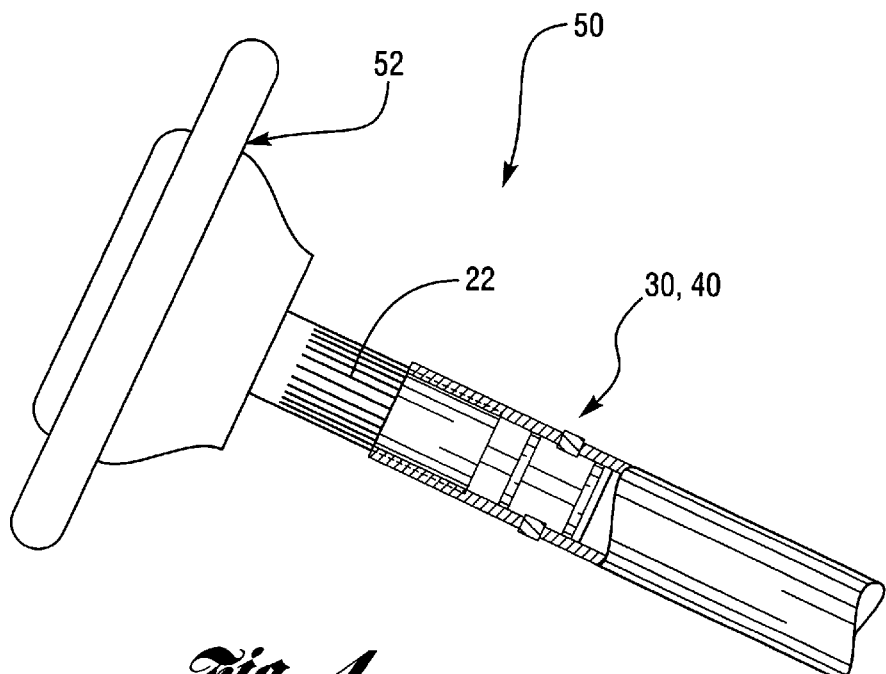
FIG. 4 is a schematic view of a variable length steering column system utilizing the variable length shaft system according to the principles of the present invention.

The present invention, as described above, can be utilized in various applications. One such application is an adjustable steering column assembly 50, as shown in FIG. 4. This system includes a steering wheel 52 which is rigidly attached to the shaft 22 of a variable length shaft system. Specifically, embodiment 30 of FIG. 2, or 40 of FIG. 3, can be used in the adjustable steering column assembly. When the MRF 12 is in its liquid state, the driver may vary the length of the steering column 50 as desired. This embodiment of the variable length shaft system would 1o require the spline sections 26 and 27, as discussed previously, allowing for torque transfer. It must also be noted that the driver would activate the system via a button or lever (not shown), switching between the liquid and solid states of the MRF 12, to allow for either adjustment or position lock. With the variable length shaft system 30 of FIG. 2, a button would activate the electromagnet 32 which balances the magnet field of the permanent magnet 26 allowing for adjustment. Once the steering wheel 52 is adjusted as desired, the electro-magnet 32 is de-energized so that the magnetic field of the permanent magnet 26 causes the MRF 12 to solidify and prevent movement of the steering wheel 52.

Figure 5:
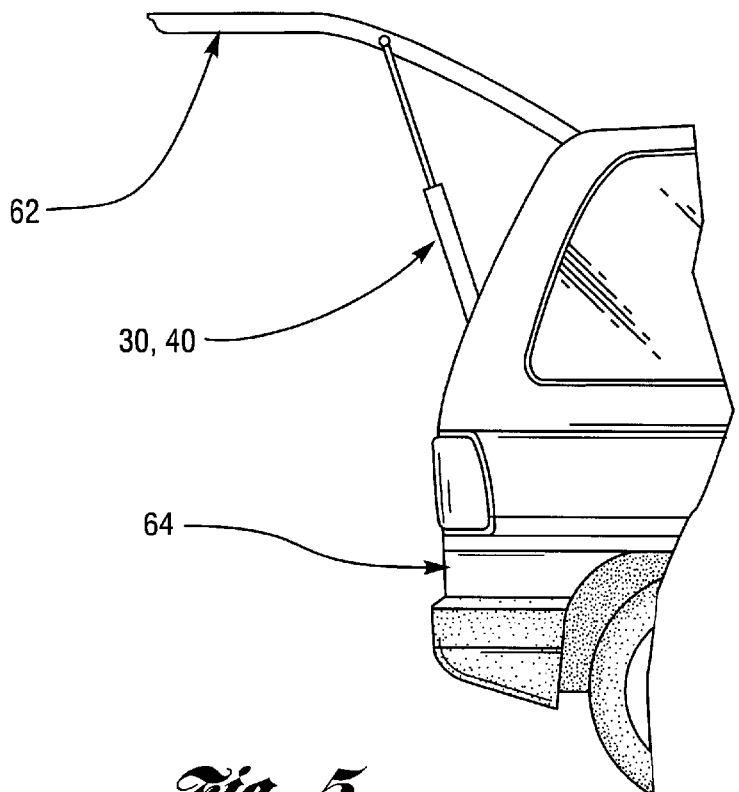
FIG. 5 is a schematic view of a door which utilizes the variable length shaft system according to the principles of the present invention.

As shown in FIG. 5, the variable length shaft system may be utilized as a mechanism to hold open a door 62 such as a rear hatch of a vehicle, replacing commonly used hydraulic systems. This embodiment consists of a door 62 pivotally attached to a vehicle 64 and the variable length shaft system as a variable length link between the two. The variable length shaft systems 30, 40 as shown in FIGS. 2 and 3, respectively can be used in combination with the door 62. In general, the MRF 12 would be in its liquid state allowing for free movement of the door 62. As desired, a person may open or close the door 62 to a level desired, then activate the system such that the door 62 is held at the desired position. The system could also be configured such that when the door 62 is fully open, the system automatically activates, locking the door 62 into position. The system could then easily be deactivated by applying pressure on the door 62.

Figure 6A:
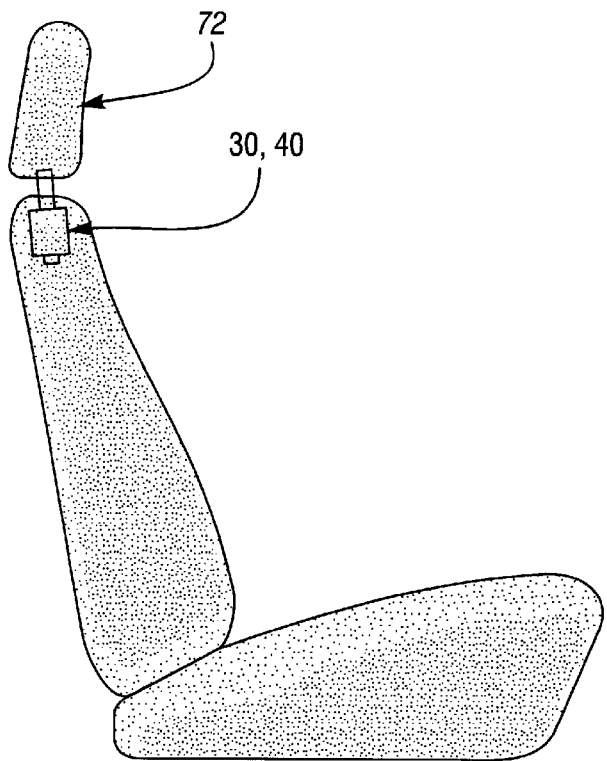
FIG. 6 is a schematic view of a headrest which utilizes the variable length shaft system according to the principles of the present invention to allow for adjustment and position lock.
Figure 6B:
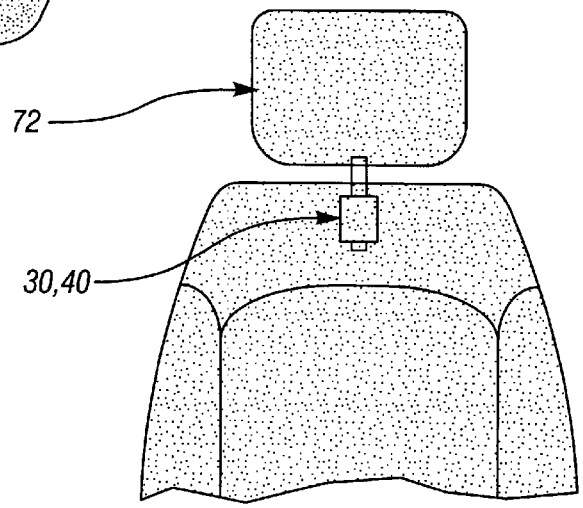

Another use for the variable length shaft system according to the present invention is in adjustable headrests for seats. FIGS. 6A and 6B show a seat assembly 74 having a headrest 72 linked to the seat assembly via a variable length shaft system 30, 40 such as disclosed in FIGS. 2 and 3. A driver or passenger may adjust the height of the headrest 72 as desired. By activating the liquid state of the MRF 12 as described above, a person may freely move the headrest 72 to a desired location. Once in position, the solid state of the MRF 12 may then be activated, locking the headrest in position. The driver or passenger would activate the system via a button or lever (not shown), switching between the liquid and solid states of the MRF 12, to allow for either adjustment or position lock as described above with reference to the embodiment of FIG. 4.

Figure 7:
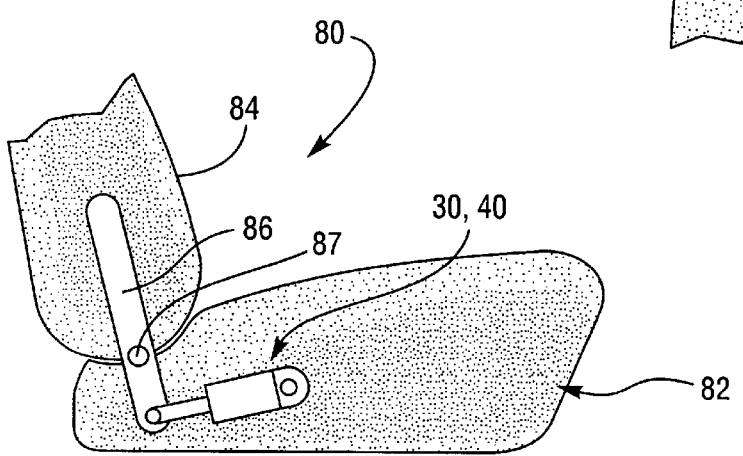
FIG. 7 is a schematic view of a seat which utilizes the variable length shaft system according to the principles of the present invention to allow for adjustment and position lock of the seat back relative to the seat.

Another embodiment of the invention is as a seatback adjuster for a seat assembly 80 as shown in FIG. 7. The seatback 84 is rigidly connected to one end of a lever 86. In turn, the center portion of the lever 86 is pivotally connected at a pivot point 87 to the seat bottom or a seat frame and connected to the variable length shaft system 30 or 40 at the opposite end. As the length of the variable length shaft system 30, 40 is adjusted, the lever 86 rotates about the pivot point 87 causing the seatback 84 to come forward or backward, as desired. To achieve this, the variable length shaft system 30, 40 would be adjusted by a button or lever (not shown) as discussed previously, which a person would activate to either liquefy or solidify the MRF 12 for adjustment or locking, respectively.

Figure 8:
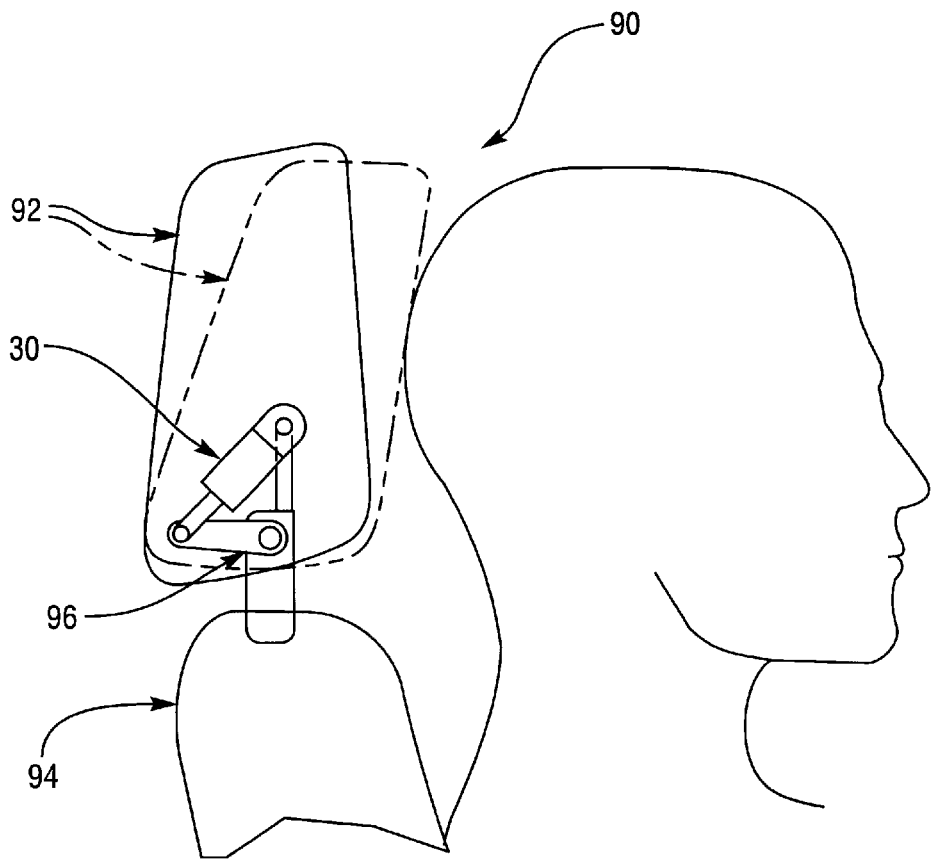
FIG. 8 is a schematic view of an anti-whiplash headrest system utilizing a variable length shaft system according to the principles of the present invention.

Several thousand accidents occur annually which result in various injuries including whiplash. FIG. 8 shows a headrest system which helps prevent whiplash injury. As is shown, an anti-whiplash system 90 is comprised of a headrest 92 and a seatback 94. Internal to the headrest 92 is a spring-loaded lever system 96 which is connected to the variable length shaft system 30 and pivotally connected to the seatback 94. During normal operation, the headrest 92 is in the driver or passenger's preferred position, held in place by the variable length shaft system 30 with the MRF 12 in its solid state. In the event of an accident, a crash sensor (not shown) sends a signal activating the electromagnet 32. This activation causes the electromagnet 32 to generate a magnetic field, effectively canceling the field generated by the permanent-magnet 26, as described above. The negation of the magnetic field causes the MRF 12 to return to its liquid form in milliseconds. Without the support of a rigid variable length shaft system, the spring mechanism 96 activates, quickly pivoting the headrest into a forward 'crash' position closer to an occupant's head. This new position would be such that the possibility of neck injury due to whiplash would be reduced.

Figure 10:
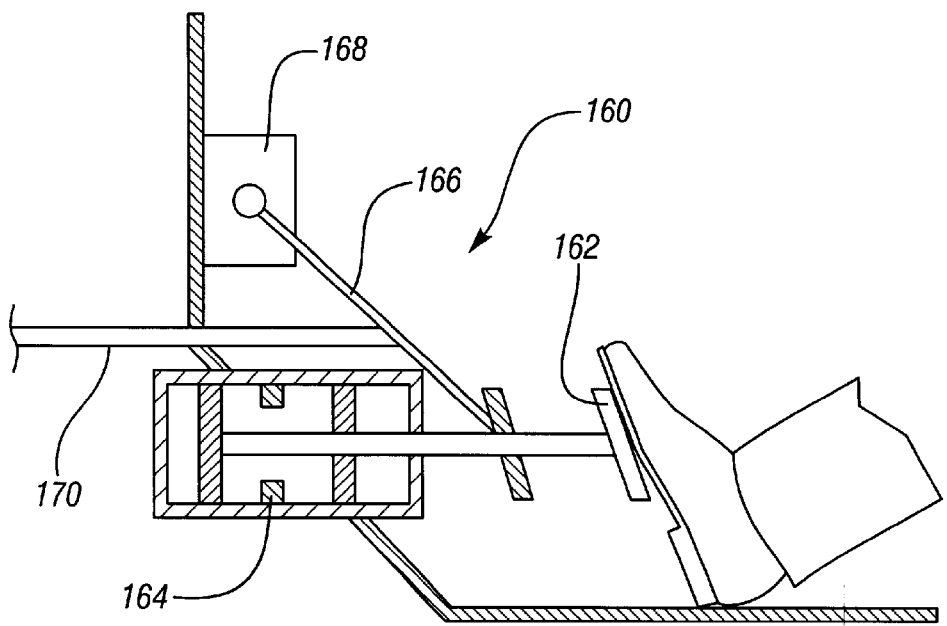

FIGS. 9 and 10 each show an adjustable pedal system utilizing the variable length shaft system of the present invention. The adjustable pedal system 150 shown in FIG. 9 includes a pedal member 152 pivotally mounted to a support member 154. The support member 154 is supported by a variable length shaft system 156 as discussed above. A cable 158 is attached to the pedal member 152 and is preferably capable of being adjusted in length. With reference to FIG. 10, an adjustable pedal system 160 includes a pedal member 162 attached to a variable length shaft system 164 which is mounted to pivot arm 166. The pivot arm 166 is pivotally mounted to a fixed support member 168. The variable length shaft system 164 is adjustable to allow the pedal member 162 to be moved relative to the pivot arm 166. A cable 170 can be attached to the pivot arm 166 and does not need to be adjusted when the pedal position is adjusted.

With respect to each of the above embodiments, the internal space and plunger system can be provided with dampening means to prevent uninhibited movement of the plunger device relative to the housing when the magnetic field is removed. Otherwise, an external dampening device can also be provided.

The invention being thus described, it will be obvious that the same may be varied in many ways. Such variations are not regarded as a departure from the spirit and scope of the invention, and all such modifications as would be obvious to one skilled in the art are intended to be included within the scope of the following claims.

What is claimed is:

1. A variable length shaft system comprising:
   a housing defining an internal space having at least one spline portion positioned therein;
   a shaft including at least one spline portion which engages said at least one spline portion of said housing;
   a plunger system located within said internal space and connected to said shaft;
   a volume of magneto-rheological fluid locked within said internal space; and
   an electro-magnet located in close proximity to said magneto-rheological fluid, wherein the electro-magnet is arranged to selectively liquefy the magneto-rheological fluid to allow the plunger system to be moved within the internal space to axially move the shaft relative to the housing to attain a desired overall length for the shaft system, and solidify the fluid thereafter to inhibit movement of the plunger system to lock the shaft system at the attained length.

2. The variable length shaft system of claim 1, including a stopping mechanism located within said housing.

3. The variable length shaft system of claim 1, wherein said plunger system includes an upper and a lower plunger.

4. The variable length shaft system of claim 1, further comprising a steering wheel connect to said variable length shaft system, wherein said variable length shaft system is a steering column which allows for adjustment and position look of said steering wheel.

5. The variable length shaft system of claim 1, further comprising a seatback and a headrest attached to said seatback by said variable length shaft system, said variable length shaft system allowing for adjustment and position lock of said headrest relative to said seat back.

6. The variable length shaft system of claim 1, further comprising a vehicle having a door pivotally attached thereto and adjustably held in an open position by said variable length shaft system.

7. The variable length shaft system of claim 1, further comprising a seat bottom and a seatback pivotal relative to said seat bottom, wherein said variable length shaft system is utilized in conjunction with said seat bottom and said seatback allowing for pivotal adjustment and position lock of said seatback relative to said seat bottom.

8. The variable length shaft system of claim 1, further comprising a seatback and a headrest pivotally mounted to said seatback, wherein said variable length shaft system is utilized in conjunction with a spring loaded pivoting device allowing for quick forward motion of said headrest in an even of an accident.

* * * * *